United States Patent [19]
McGehee

[11] 3,792,536
[45] Feb. 19, 1974

[54] ROTARY DEHYDRATOR-GRANULATOR

[75] Inventor: Wallace L. McGehee, Kansas City, Mo.

[73] Assignee: American Pollution Prevention Co., Inc., Minneapolis, Minn.

[22] Filed: Oct. 19, 1972

[21] Appl. No.: 298,952

[52] U.S. Cl............................ 34/11, 259/3, 259/85, 34/102, 34/136
[51] Int. Cl.............................................. F26b 7/00
[58] Field of Search ... 34/10, 11, 33, 57 R, 58, 133, 34/136, 102, 137; 432/119, 122; 259/3, 85

[56] References Cited
UNITED STATES PATENTS

| | | | |
|---|---|---|---|
| 3,717,937 | 2/1973 | Thompson | 34/136 |
| 2,744,338 | 5/1956 | Rothe | 34/58 |
| 2,578,166 | 12/1951 | Bill | 34/136 |
| 2,076,873 | 4/1937 | Arnold | 34/57 R X |
| 2,090,177 | 8/1937 | Bill | 34/11 |
| 1,173,188 | 2/1916 | Hetherington | 34/137 X |

FOREIGN PATENTS OR APPLICATIONS

| | | | |
|---|---|---|---|
| 221,048 | 4/1962 | Austria | 34/11 |

*Primary Examiner*—Carroll B. Dority, Jr.
*Assistant Examiner*—William C. Anderson
*Attorney, Agent, or Firm*—Schmidt, Johnson, Hovey & Williams

[57] ABSTRACT

A rotary dehydrator-granulator is provided for receiving viscid, high moisture content material such as middlings, bran or the like for processing into a dried granular form suitable for livestock feed. The material is conveyed through an inlet and interiorly along an elongated rotating drum by an auger in an open trough which discharges the material at an end opposite the inlet for subsequent tumbling by the drum. A suction fan draws the material, along with hot air emanating from a hot gas source, back toward a perforated screen outlet at the same end of the drum as the inlet. As the material is being tumbled, a portion of the semidried material is deposited in the open auger trough and mixed with moist material. By controlling the temperature of the hot air a predetermined amount of moisture may be removed from the thoroughly mixed material by the time it reaches the outlet, thereby lessening the adhesive quality of the material such that it separates into relatively small, substantially uniform granules of reduced moisture content which drop out of the drum through the outlet. That material which has not been sufficiently dried and formed into granules of a size to permit their exit through the outlet continue to tumble until their size becomes small enough to allow them to drop through the outlet or, in the case of overdrying, the fan draws the material past the outlet and into a dust collector from which the material is returned to the drum for remixing with moist material.

16 Claims, 6 Drawing Figures

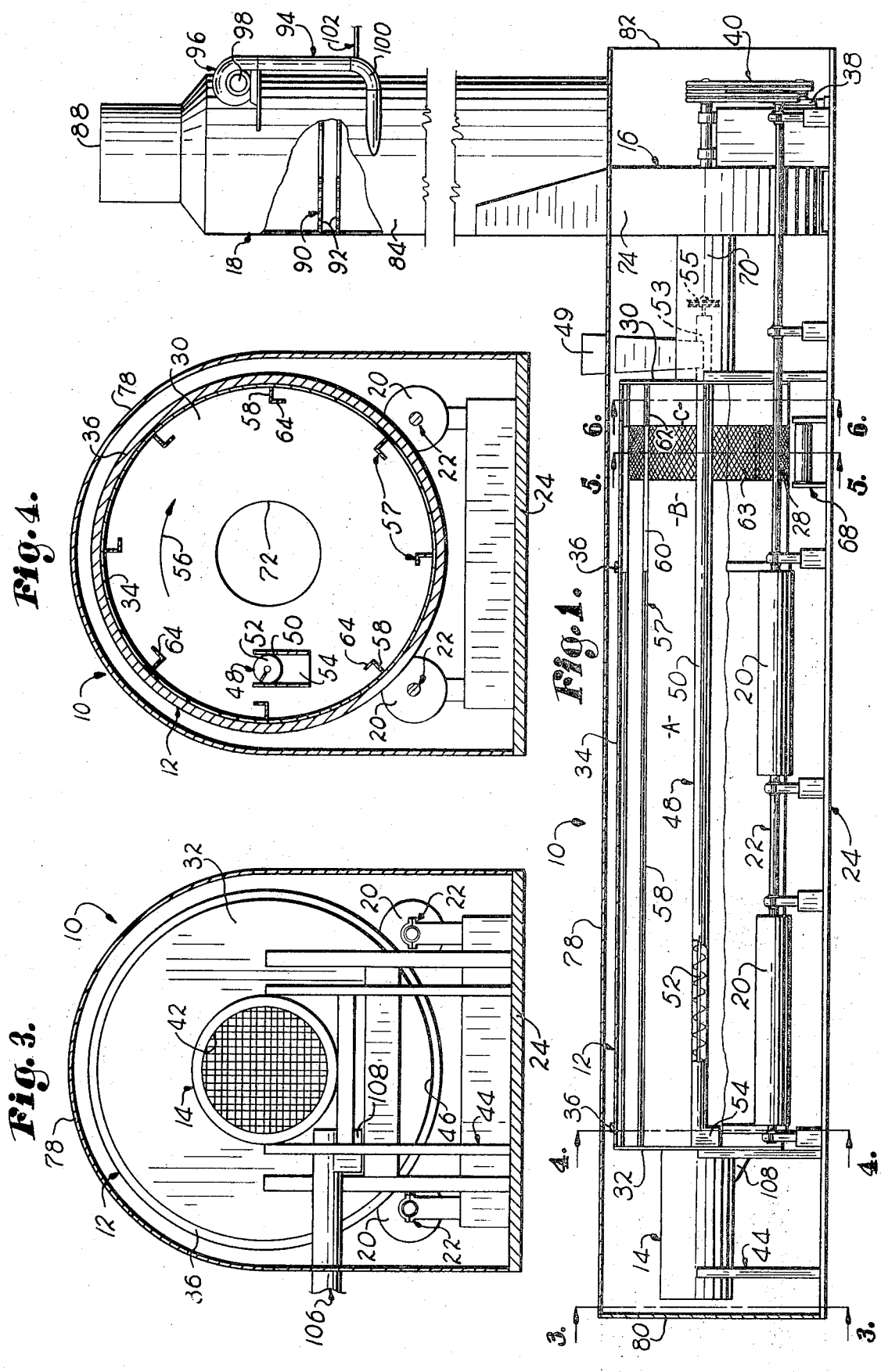

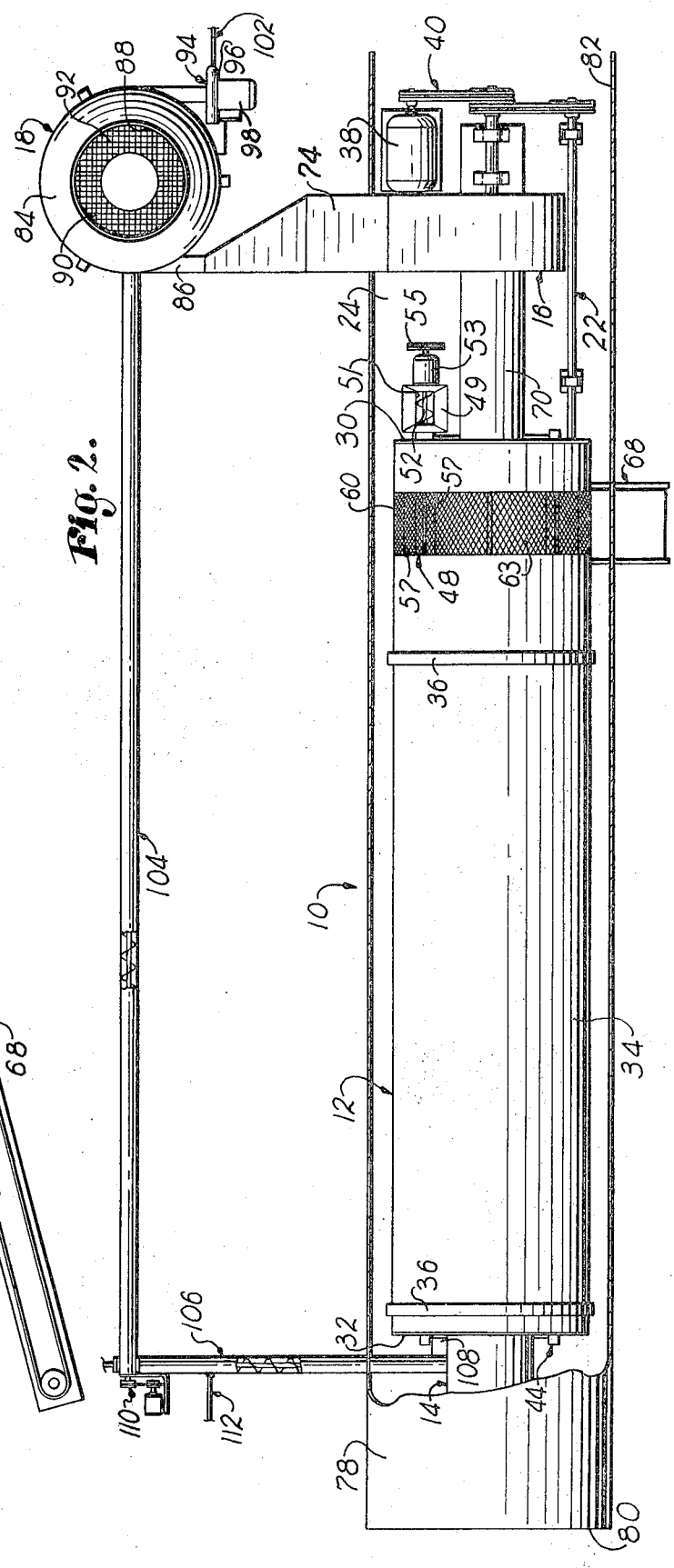
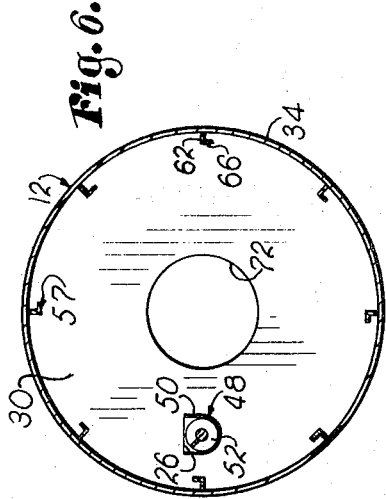
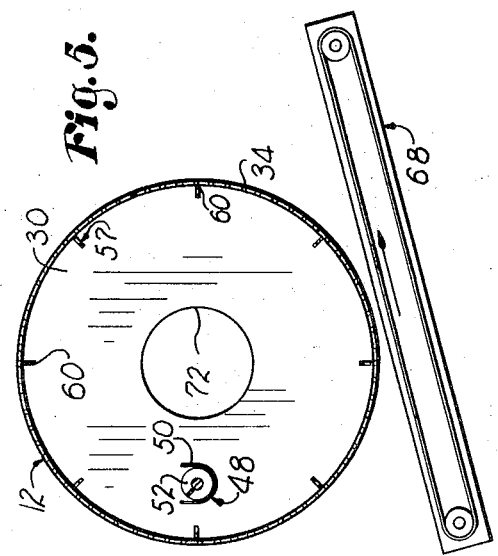

ROTARY DEHYDRATOR-GRANULATOR

This invention relates to a device for processing particulate material such as middlings, bran or the like which is commonly used for livestock feeding purposes and is a residual by-product of grain milling operations. These materials have considerable nutritional value as a livestock feed provided it is in a compact and easily handled form.

The material may vary in moisture content such that it is either very dry and powdery, or more frequently, it has absorbed moisture to the point that it has become a viscid, sticky mass which not only is difficult to handle but which precludes its being safely stored in bulk without risking the danger of spoilage or overheating. At the same time, depending on the ultimate disposition of the material, such as readying it for use as feed, it may be desirable to remove only a certain portion of the moisture and not completely dry the same. Not only is the viscid material undesirable from a quality standpoint, but it is also difficult to process because of its poor flow characteristics as well as its inability to mix well with other ingredients with which it might eventually be combined.

A further problem encountered in the handling of material of this nature is that of adequately controlling the extent to which the material is dried and maintaining this uniformity of drying throughout the entire quantity thereof. If portions of the material are permitted to remain at a relatively high moisture content level, the entire quantity of material is subject to spoilage and may have other detrimental effects in its subsequent usage.

It is, therefore, a very important object of my invention to provide a dehydrator-granulator that is capable of producing a palatable, concentrated livestock feed from the bran, germ and fibers left over from grain milling operations commonly referred to as middlings.

It is another very important object of my invention to provide a dehydrator-granulator which is capable of lowering the moisture content of viscid masses of particulate material to a predetermined level and to deliver the material in a substantially dry, granular form to a predetermined, uniform, maximum size.

Yet another important object of the instant invention is to provide a dehydrator-granulator that is capable of recycling material that has become overdried and remixing it with high moisture material for subsequent removal in a granular form having a limited predetermined moisture content.

Another object of my invention is to provide for the continuous mixing of partially dried material with newly introduced moist material for producing a mixture of uniform moisture content.

Another object of the instant invention is to provide a dehydrator-granulator in which relatively cool air is drawn into the dehydrator for cooling those overdried particles that are to be ultimately returned to the dehydrator-granulator for mixture with newly introduced moist material.

Still another object of the invention is to provide for a common air supply which serves as a heat exchanger for cooling the rotating drum of the dehydrator-granulator in addition to being the source of air which is heated and drawn through the drum to remove the moisture from the material.

In the drawings:

FIG. 1 is a fragmentary, side elevational view of a rotary dehydrator-granulator made pursuant to the present invention, portions thereof shown in section or broken away to reveal details of construction;

FIG. 2 is a plan view of the dehydrator-granulator shown partially in section and having portions broken away to reveal details of construction;

FIG. 3 is an enlarged, transverse, cross-sectional view taken along line 3—3 of FIG. 1;

FIG. 4 is a view similar to FIG. 3 taken along line 4—4 of FIG. 1;

FIG. 5 is a transverse, cross-sectional, slightly enlarged view of the rotary drum and lateral belt conveyor taken along line 5—5 of FIG. 1, the shroud and certain other components having been removed for purposes of clarity; and FIG. 6 is a view similar to FIG. 5 taken along line 6—6 of FIG. 1.

A rotary dehydrator-granulator, broadly designated by the numeral 10, is comprised of an elongated drum 12 having a longitudinal, horizontally disposed axis, a hot gas source 14 disposed for communication with the drum, means in the nature of a suction fan 16 for transferring the material and gases longitudinally along the interior of the drum, and a dust collector 18. The drum 12 is rotatably supported by two pairs of longitudinally spaced rollers 20 disposed beneath the drum 12 and having axes of rotation parallel to the longitudinal axis of the drum 12. The rollers, in turn, are carried by respective shaft and bearing assemblies 22 affixed to a base 24.

The drum 12 is provided with an inlet 26 and an outlet 28, both of which are at or proximal an end 30 of the drum 12 and a wall 34 which is in frictional engagement with the rollers 20. It is to be here noted that the end 30, as well as the opposite end 32 of the drum 12 are stationary, while the wall 34 is the only portion of the drum 12 which is rotatable. A pair of longitudinally spaced, guide rings 36 encircling the exterior of the wall 34 engage the outer ends of respective opposed rollers 20 such that the latter are intermediate the rings 36 to prevent longitudinal shifting of the drum 12 relative to the rollers 20 during rotation. A power source in the form of an electric motor 38 may be used to rotate the suction fan 16, as well as the drum 12, through the use of a belt and pulley drive mechanism 40, as best seen in FIG. 2, wherein it is shown that one of the shaft and bearing assemblies 22 has been extended to have an end thereof in alignment with and coupled to the belt mechanism 40.

The hot gas source 14 is of the conventional type as is well known in the industry and includes a series of fuel-fed burners (not shown) which heat atmospheric air as it is drawn through an inlet 42 and subsequently introduced into the drum through an opening (not shown) in the end 32. A support structure 44 is provided so that the hot air source 14 is centrally located with respect to the end 32, there also being an air inlet 46 in the end 32 beneath the source 14 for introduction into the drum 12 of air that has not been heated by virtue of the passage through the source 14.

A conveyor 48 which includes an open-top trough 50 having an auger 52 therein extends through the inlet 26 longitudinally interiorly of the drum 12 and has a discharge 54 adjacent the opposite end 32. The inlet 26, the conveyor 48, and the axis of rotation of the drum 12 are all located on a substantially common horizontal plane, with the conveyor 48 being intermediate the axis and the upwardly moving portion of the wall 34, as best seen in FIG. 4, the rotational direction of the drum 12 being indicated by an arrow 56.

The conveyor 48 extends exteriorly of the drum 12 a sufficient distance to permit a feed hopper 49 to be placed in communication with an opening 51 in a closed, tubular portion 53, the portion 53 being that part of the conveyor exteriorly of the drum 12. The auger 52 may be powered by an electric motor (not shown) coupled with a pulley 55 which, in turn, is affixed to a shaft extension of the auger 52.

Attached to the wall 34 in parallelism with the longitudinal axis of the drum 12 and interiorly thereof, is structure in the nature of a plurality of rows of elongated, circumferentially spaced vanes, the rows being identified by the numeral 57. Each row 57 of vanes is comprised of an L-shaped vane 58 which extends from the end 32 to a point in the general vicinity of the guide ring 36 adjacent the end 30, a planar vane 60 extending from vane 58 to and across the outlet 28 and a second L-shaped vane 62 extending from the vane 60 to the end 30, all vanes being in longitudinal alignment. The vanes 58 and 62 each have a respective leg 64 and 66 projecting in the direction of rotation of the drum and in spaced relationship thereto, while the vane 60 is planar and projects inwardly from the wall 34 toward the axis of rotation.

The drum 12 includes a perforate wall section in the form of a screen 63 defining the outlet 28 and is made of expanded metal or the like to present a series of apertures through which the material drops. It is suggested that the screen 63 be removable in order that other sections having alternate sized openings may be substituted to control the sizing of granulated material as will be further explained hereinafter. The section 63 extends entirely around the circumference of the drum 12, thus providing the continuously downwardly facing outlet 28 for gravitation of the material to a belt-type conveyor 68 disposed beneath the drum 12 to receive and laterally remove the processed material deposited thereon. It is to be understood that other conveyances or assemblies could well be adapted to remove the material in place of the conveyor 68 as shown.

A tube 70 in axial alignment with the axis of rotation of the drum 12 and with an opening 72 in the end 30, places the suction fan 16 in communication with the interior of the drum 12. The fan 16, which includes a housing 74, is positioned transversely to the direction of travel of the material and hot air as they are drawn through the drum 12 so as to receive the air and that material not dense enough to gravitate through the outlet 28 and blow the same into the dust collector 18.

An elongated shroud 78 is provided in spaced, overlying relationship to the drum 12 and the hot gas source 14, as well as a substantial portion of the fan 16, thereby for all practical purposes enclosing the aforementioned components. An end 80 of the shroud 78 proximal the hot air source 14 is closed, while the opposite end 82 is open to permit entry of atmospheric air which is then drawn toward the inlets 42 and 46.

The collector 18 is in the form of an elongated, hollow, cylindrical body having a longitudinal, upright wall 84 provided with an air inlet 86 in communication with the housing 74 and an air outlet 88. The inlet 86 is tangent to the wall 84 such that the particles blown into the collector 18 by the fan 16 are centrifugally forced adjacent the interior of the wall 84 as the air and particles move in an upward spiral toward a device 90 disposed interiorly of the body between the inlet 86 and the outlet 88 for causing the particles to be separated from the air as the same travel toward the outlet 88. The device 90 is comprised of a pair of annular, spaced-apart screens 92 placed transverse to the direction of travel of the air and particles toward the outlet 88.

Also included as a part of the collector 18 is a mechanism 94 in communication with the interior of the collector 18 and in a position to withdraw from the air any particles not separated by the device 90 and to reintroduce these particles into the airstream imtermediate the inlet 86 and the device 90 for subsequent separation. The mechanism 94 includes a suction fan 96, driven by an electric motor 98, which is tangentially disposed to the wall 84 intermediate the device 90 and the outlet 88. Means for reintroducing these withdrawn particles back into the airstream include a return duct 100 interconnecting the fan 96 with an inlet (not shown) immediately below the device 90. If desired, there may also be provided a humidifying means 102 in communication with the duct 100 for adding moisture to the particles as they are reintroduced into the collector 18.

A first tube and auger assembly 104 is in communication with the lower end of the collector 18 and is disposed to receive the material collected thereby and elevate and return the same to the drum 12 at the end 32. The assembly 104 discharges the material into a second cross auger assembly 106 which ultimately deposits the material in a chute 108 which directs the material into the drum 12 through an opening (not shown) in the end 32 just above the air inlet 46. An electrically powered belt and pulley drive 110 powers the assembly 104, it being understood that a similar drive is also provided for the assembly 106, although not shown. A moisturizing means 112 in communication with the assembly 106 introduces a water spray thereinto for mixing with the material as it is returned to the drum 12.

In operation, the high moisture content material which has an adhesive, glutinous consistency is fed into the dehydrator-granulator 10 through the hopper 49 and the opening 51 to the conveyor 48. This sticky material is conveyed interiorly of the drum 12 which has been heated to a temperature of approximately 900° F. by virtue of the fan 16 drawing air through the inlet 42 and the hot air source 14. As the material is being conveyed toward the discharge 54, counter to the flow of air, the rotating drum 12, with its rows of vanes, is picking up and tumbling the previously discharged material.

While the material is being tumbled, the hot gases emanating from the source 14 into the drum 12, are intermixing with the material and, in so doing, absorbs moisture from the material. As the drying process continues, the viscous quality of the material is lessened, causing the adhered particles to gradually separate into smaller masses as the moisture is removed therefrom, thus in effect, granulating the material. As a further aid to the granulating process a portion of the tumbling, semidried material is received in the open trough 50 for admixture with the moist material as the latter is being advanced toward the discharge 54 by the auger 52.

The drum 12 has three tumbling or mixing sections generally designated by the letters A, B and C. The section A is distinguished by the L-shaped vanes 58, section B by the planar vanes 60, and section C by the shorter L-shaped vanes 52. The L-shaped vanes 58 and 62 provide a fairly intensive tumbling action and thus have a more thorough mixing capability while the planar vanes 60 in the vicinity of the screen 63 and the outlet 28 do not raise and tumble the material as violently as do L-shaped vanes. The L-shaped vanes 62 defining the section C again provide the intense tumbling action needed to finally break up that material which did not drop through the outlet 28 in order that it might be further dried to be drawn through the fan 16 for subsequent reintroduction into the drum 12 via collector 18.

The extent to which the material is granulated is predicated on the amount of moisture removed therefrom and this, in turn, is determined by the temperature of the air being introduced into the drum 12 and the length of time that the material remains in the drum, it being understood that the hotter the air the more rapid the rate of drying. As the material dries and becomes lighter, it is drawn toward the outlet 28 by the fan 16 at which time those masses that have been dried and reduced to a size that will permit their gravitation through the perforate screen 63, exit through the outlet 28 to the conveyor 68. That material which has not been sufficiently dried to cause its separation into granules sufficiently small to drop through the perforations of the screen 63 continue to tumble until such time that their size permits their exit through the outlet 28 or until the material has become so dry and lightweight that the suction fan 16 overcomes the gravitational pull and draws the now particulate material through the tube 70 and thence blows it into the collector 18.

As the overdried particulate material is transferred from the drum 12 to the collector 18 by the fan 16, it enters the collector 18 through the tangent inlet 86 and by virtue of the arcuateness of the wall 84, is caused to spiral upwardly with the air until such time as the stream of air is broken up by the screens 92. The breaking up of the airstream effectively reduces its particle-carrying capability such that the particles drop to the bottom of the collector 18. The screens also separate the lighter particles by deflecting the latter causing the same to change direction so that the air no longer supports them. In the event that any very light, minute particles are carried through the screens 92 by the airstream, they are subsequently retrieved therefrom by the suction of the fan 96 as they continue their swirling pattern adjacent the wall 84. These particles are then reintroduced through the return duct 100 into the airstream below the screens 92. The humidifier 102 dispenses sufficient moisture into the duct 100 to raise the moisture content of the overdried particles causing them to have a tendency to adhere to one another, and in so doing become heavier so that they are not as easily carried by the upwardly moving airstream and will fall to the bottom of the collector 18 or again be subject to separation from the air upon their approaching the screens 92.

After the material has dropped to the bottom of the collector 18 it is removed therefrom by the auger assembly 104 from whence it is subsequently transferred to the cross auger assembly 106. As the material is augered toward the chute 108 the moisturizer 112 sprays additional water into the material for purposes of keeping the overdried material from burning as it is reintroduced into the hot end of the drum 12. The material is reintroduced into the drum 12 immediately above the inlet 46 through which relatively cool air, as compared to that air being introduced through the hot gas source 14, is being introduced and relatively close to that area into which the high moisture material is discharged from the conveyor 48. Thus the reintroduced dried material is immediately intermixed with the newly introduced high-moisture material and is not fed directly into the blast of hot air. The air entering the drum 12 through the inlet 46 serves to keep the material from building up in the bottom of the drum near the end 32.

The shroud 78 serves a twofold purpose in that as the air is drawn through the opening or end 82 and moves longitudinally toward the end 80, it absorbs heat radiating from the rotating drum 12 and, in effect, becomes preheated prior to its entering the inlet 42, this absorption of heat from the drum 12 also serving to keep the wall 34 from overheating. By way of further description, it is to be noted that there is no need for any particular sealing means between the stationary ends 30 and 32 and the rotating wall 34 as long as there is insufficient space therebetween to cause the heavier material to drop through, it being recognized that normally, air would be drawn through these spaces as well as through the previously identified inlets.

The continual tumbling and admixing of partially dried material with the counterflowing moist material insures a thorough mixing and uniform drying of the material under controlled temperature conditions to form granules of a predetermined, generally uniform size. Only that material that is sufficiently dried to lose a part of its adhesive qualities and separate into a granule small enough to pass through the screen 63 is removed through the outlet 28. That material which has become overdried proceeds on past the outlet 28 by virtue of the suction created by the fan 16 and is subsequently returned to the drum 12 after being separated from the air by the collector 18.

Not to be overlooked is the fact that some air is also being drawn into the drum 12 proximal end 30 through the section 63 as the air supply is being drawn toward the end 80 of the shroud 78. This introduction of supplementary air provides additional cooling of the material drawn past the outlet 28 and before it is blown into the collector 18. Because of this additional air being introduced into the drum at this point, the material enters the fan 16 and collector 18 at approximately 200° F. as compared to the approximate 900° F. temperature at the end 32 of the drum 12. The passage of air through the material outlet 28 has no appreciable effect on the removal of the material as the latter gravitates therethrough because the gravitational pull on the granules is greater than the pull exerted by the velocity of the air entering the drum. In fact, the air entering at this point is beneficial in that it counteracts the tendency for any particles of a lesser size than that desired from also gravitating through the opening 28. Thus, a uniform, granular material is produced and is not contaminated with undesirable fines or other dust. Attention should also be called to the fact that the outlet 28, for all practical purposes, is always at the generally lowermost point of the drum 12 while the air is drawn through the screen 63 about the entire circumference of the drum 12.

A significant feature is the counterflow arrangement of moving the material interiorly of the drum so that the material actually has to travel the length of the drum twice while being dried and reduced to the desired granular size. This arrangement permits generally twice the dwell time that would otherwise normally be expected in a drum of a specified length and which has its material inlet at one end and its material outlet at the opposite end.

Although not shown, it is possible to provide for the introduction of a binding agent such as molasses, at the feed hopper 94. Furthermore, in those instances where a material has been overdried and it is desired to have an end product of a larger granular size, it is contemplated that moisture could be added to the material just prior to its introduction to the dehydrator-granulator and under the temperature controlled capability thereof as well as the sizing feature of the perforated screen outlet 28, the proper size granules obtained.

Having thus described the invention, what is claimed as new and desired to be secured by Letters Patent is:

1. A material dehydrator-granulator including:
   an elongated drum having a longitudinal, horizontally disposed axis,
   said drum being rotatable about said axis and being provided with an inlet and an outlet both at one end thereof;
   a hot gas source in communication with said drum at the opposite end of the latter;
   a conveyor extending through said inlet and thence longitudinally of the drum for advancing moist material along said drum toward said opposite end,
   said conveyor having a discharge remote from said inlet for feeding said material into the drum;
   structure interiorly of and attached to said drum for raising and tumbling said fed material during rotation of the drum for intermixing said material with the hot gases emanating from said source; and
   means for transferring the intermixed material and gases longitudinally along the interior of said drum toward said outlet,
   said conveyor being disposed in a position to receive a portion of the tumbling material for admixture with said moist material being advanced by said conveyor.

2. A dehydrator-granulator as claimed in claim 1 wherein said conveyor includes an open-top trough having an auger therein.

3. A dehydrator-granulator as claimed in claim 1 wherein said drum is provided with stationary end walls.

4. A dehydrator-granulator as claimed in claim 1 wherein said discharge is adjacent said opposite end.

5. A dehydrator-granulator as claimed in claim 1 wherein said outlet is a perforate wall section of said drum.

6. A dehydrator-granulator as claimed in claim 5 wherein said section extends around the drum.

7. A dehydrator-granulator as claimed in claim 1 wherein said structure includes a plurality of rows of elongated, circumferentially spaced vanes secured to the drum therewithin in parallelism with said axis.

8. A dehydrator-granulator as claimed in claim 7 wherein certain of said vanes are L-shaped and certain other of said vanes are planar.

9. A dehydrator-granulator as claimed in claim 8 wherein each row of vanes is comprised of a first L-shaped vane, a planar vane and a second L-shaped vane all of which are in longitudinal alignment.

10. A dehydrator-granulator as claimed in claim 9 wherein said outlet is a perforate wall section, said planar vanes extending across said section and terminating intermediate said section and said opposite end.

11. A dehydrator-granulator as claimed in claim 8 wherein said L-shaped vanes each have one leg projecting in the direction of rotation of said drum in spaced relationship to the latter.

12. A dehydrator-granulator as claimed in claim 1 wherein said transfer means includes a suction fan in communication with said drum at said one end.

13. A dehydrator-granulator as claimed in claim 1 wherein there is provided a dust collector in conjunction with said transfer means for collecting from said gases any particles of material carried beyond said outlet by said means.

14. A dehydrator-granulator as claimed in claim 13 wherein there is provided apparatus for returning said collected particles to said drum.

15. A dehydrator-granulator as claimed in claim 14 wherein said apparatus returns said particles to said opposite end.

16. A dehydrator-granulator as claimed in claim 1 wherein there is provided an elongated shroud in spaced overlying relationship to said drum and said hot gas source, said source and said transfer means being disposed at opposite ends of said drum, the end of said shroud proximal said source being closed.

* * * * *